Dec. 28, 1965    R. P. BENJAMIN    3,226,717
FM-CW RADAR ALTIMETER APPARATUS
Filed Sept. 19, 1961    2 Sheets-Sheet 1

INVENTOR.
ROBERT PAINTER BENJAMIN
BY Darby & Darby
ATTORNEYS

Dec. 28, 1965  R. P. BENJAMIN  3,226,717
FM-CW RADAR ALTIMETER APPARATUS
Filed Sept. 19, 1961  2 Sheets-Sheet 2

INVENTOR.
ROBERT PAINTER BENJAMIN
BY
Darby & Darby
ATTORNEYS 3,226,717
FM-CW RADAR ALTIMETER APPARATUS
Robert Painter Benjamin, Rockville, Md., assignor to Litton Systems, Inc., a corporation of Maryland
Filed Sept. 19, 1961, Ser. No. 139,092
16 Claims. (Cl. 343—14)

The present invention relates to the art of radio distance indicators, such as altimeters, terrain clearance indicators, radar, collision avoidance systems, and other uses, and is more particularly concerned with such apparatus utilizing continuous-wave frequency-modulated signals.

The present invention is particularly adapted to meet the needs of all types of aircraft for accurate altimeters for lower altitudes, permitting ease of maintenance, handling, and economical large-scale production. The altimeter of the present invention measures the height above terrain directly below the aircraft in which it is mounted, to an accuracy of two feet or five percent, whichever is greater, and provides an electrical output signal linearly proportional to altitude, which may be utilized to provide a visual indication both of altitude and rate of change of altitude. The output signal may be supplied to autopilots and navigation computers, and is particularly suitable for use in achieving successful blind landings.

As a further feature of the invention, if external conditions occur which reduce the received echo signal (such as roll in excess of 30°) to below a reliable level, an "unreliable" indication is given to show that the indication should not be relied upon, and the system is arranged automatically to resume indications upon receipt of a reliable signal.

Another feature of the present invention is the provision of constant dynamic response in altimeters, over the entire range of altitudes with which the system is utilized. This is accomplished in a unique way, by making the response of the complete system to a change in altitude that of a linear first order differential equation system. This feature is important in providing accurate and reliable indications for all altitudes, since in altimeter systems the indication normally differs from true altitude during periods of changing altitude. Unless the response of the system is the same for all altitudes, the indication would be unreliable. By the present inventions, if the true altitude changes at a constant rate, the indicated altitude lags the true altitude by an amount equal to that rate times a time constant factor, for all indicated altitudes. The time constant factor determines the response time of the system to changes in altitude, and can be easily designed or adjusted over a wide range to accommodate different requirements of users of the system.

The present invention also provides a novel computer arrangement useful in the present system and elsewhere, for deriving simultaneously two separate signals the product of whose amplitudes is a constant.

Other objects and advantages of the present invention will become apparent from consideration of the following specification and drawings of a preferred form of the present invention, in which:

FIGURE 1 is a graph of the Bessel function of second order and first kind, $J_2$ (B) plotted against B.

FIGURE 2 is a schematic block diagram of the system of the present invention.

FIGURE 3 is a schematic diagram of the diode attenuator circuit of the system of the present invention.

Figure 4:
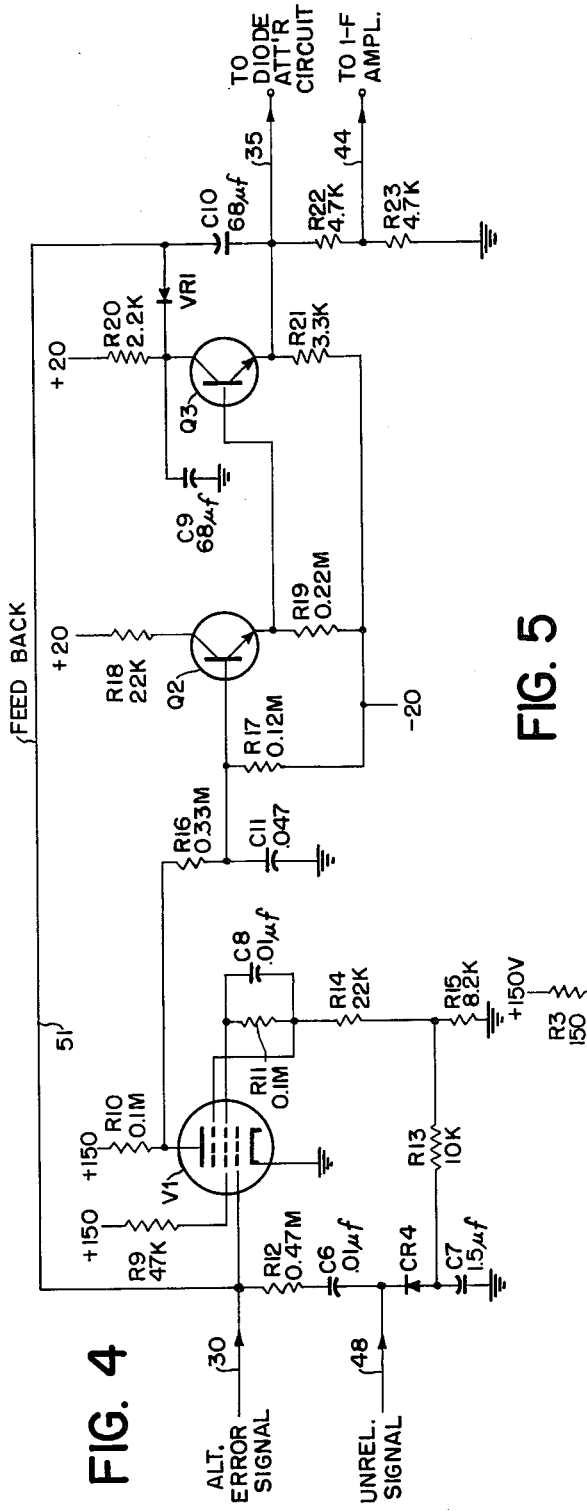
FIGURE 4 is a schematic diagram of the integrator and sweep circuit of the system of the present invention.

The operation of the present invention will be better understood by consideration of the following discussion of the general theory of coherent frequency-modulation continuous-wave radar systems.

An F.M., C.W. signal can be represented by $$F_t = f_0 + \Delta F \sin \omega_1 t \quad (4.1)$$

where $F_t$ = transmitted frequency
$f_0$ = carrier frequency
$\Delta F$ = peak deviation
$\omega_1$ = modulation angular frequency = $2\pi f_1$ The received signal frequency after reflection from the terrain is identical with the transmitted signal with the exception that it is delayed by a time T equal to the two-way propagation time (twice the height $h$ divided by the propagation velocity $c$, i.e., $2h/c$) and is shifted in frequency by an amount $f_d$, the doppler frequency shift associated with relative motion with respect to the terrain surface.

The received signal can be written as $$F_R = f_0 + f_d + \Delta F \sin \omega_1(t-T) \quad (4.3)$$

or as $$F_R = f_0 + f_d + \Delta F \sin \omega_1(t-2h/c) \quad (4.4)$$

A local signal is obtained by passing a portion of the transmitted signal through a radio-frequency translator that shifts the modulated carrier frequency $F_t$ (with all its spectral components) by an amount $f_t$. Consequently, the local signal can be written $$F_L = f_0 + f_t + \Delta F \sin \omega_1 t \quad (4.5)$$

When the local and received returned signals are both connected to a mixer (preferably of the balanced type) the mixing action results in an output signal whose instantaneous freqeuncy is equal to the difference between the instantaneous frequency of the local signal and that of the returned signal. The mixer output is:

$$F_M = f_t - f_d + \Delta F[\sin \omega_1 t - \sin (t-2h/c)] \quad (4.6)$$

Equation 4.6 can be written, by use of trigonometric identities, as $$F_M = f_t - f_d + 2\Delta F \sin \frac{\omega_1 h}{c} \cos \omega_1(t-h/c) \quad (4.7)$$

In Eq. 4.7, sin $$\frac{\omega_1 h}{c}$$

can be replaced by $$\frac{\omega_1 h}{c}$$

with negligible error. Also the term $$\frac{\omega_1 h}{c}$$

in the argument of the cosine term can be neglected since it represents a small, time-independent, phase shift.

Thus, the mixer output can be represented by $$F_M = ft - f_d + 2\Delta F \frac{\omega_1 h}{c} \cos \omega_1 t \quad (4.8)$$

This represents a frequency-modulated signal with carrier frequency equal to $f_t - f_d$, deviation equal to $$2\Delta F \frac{\omega_1 h}{c}$$

and modulation of angular frequency $\omega_1$. In terms of spectral components, this mixer output consists of spectral lines at $(f_t - f_d) \pm nf_1$. The relative amplitudes of the $n$th harmonic lines are proportional to $J_n$ (B), the Bessel function of the first kind and of order $n$, with argument B,
where $$B = \frac{2\Delta F \omega_1 h}{f_1 c}$$
$$= \frac{4\pi \Delta F h}{c}$$

In the present system as described more in detail below, the peak deviation $\Delta F$ is varied sinusoidally at a fixed control frequency (such as a 400-c.p.s. rate) by amplitude modulation of the frequency-modulating signal. That is, $$\Delta F = \Delta F_0 (1 + m \cos \omega_2 t) \quad (4.8a)$$

where $\Delta F_0$ = mean peak deviation
$m$ = degree of amplitude modulation
$\omega_2$ = angular control frequency $= 2\pi f_2$ This amplitude modulation of the frequency-modulating signal $f_1$, results in a periodic wobbling of the deviation $\Delta F$ and hence of the modulation index B.

The time required for a radar beam to pass from the altimeter of the present invention to the terrain and return is of course a function of height or altitude $h$. In the system of the present invention modulation of the transmitted beam is adjusted to null certain effects of this transit time. In the nulling process, height or altitude is measured by the amount of modulation required to produce the null condition.

The present system operates to keep the mean value $B_0$ of the modulation index B of the mixer output constant by varying the deviation $\Delta F$ of the transmitted signal in response to changes in altitude $h$.

Substituting for $\Delta F$ from Eq. 4.8a into the expression for B, yields $$B = \Delta F_0 (1 + m \cos \omega_2 t) \frac{4\pi h}{c} \quad (4.9)$$
$$= B_0 (1 + m \cos \omega_2 t)$$

where $$B_0 = \Delta F_0 \frac{4\pi h}{c} \quad (4.10)$$

Thus, the argument B of the Bessel function defining the amplitudes of the spectral lines varies about a mean value $B_0$ at a control frequency (400 c.p.s.) rate, and consequently, these spectral line amplitudes vary in a manner prescribed by the functional relationship between $J_n(B)$ and B. Since B is varying at a 400-c.p.s. rate, the amplitudes of each of the various spectral lines varies at 400 c.p.s. plus harmonics of this frequency, which result from nonlinearities in the Bessel function. This produces sidebands at either side of each spectral line.

Thus, if a single line in the mixer output spectrum is amplified in a narrow-band I.-F. circuit of bandwidth wide enough to pass the 400 c.p.s. and the Doppler shift, but narrow enough to exclude the other spectral lines and their sidebands, the result is a signal whose time variation of amplitude depends upon the altitude $h$, the means deviation $\Delta F_0$, and the percentage of amplitude modulation $m$.

FIGURE 1 presents a plot of $J_2(B)$ vs. B which is useful in explaining three mutually exclusive cases. The abscissa of this curve represent B, which is dependent upon altitude $h$ and frequency deviation $\Delta F$ as shown by Eq. 4.9. The ordinates of the curve are $J_2(B)$, which is the amplitude of the second harmonic component or sideband of the mixer output represented by Eq. 48. Hence, for the following discussion, this sideband is considered separated from the remainder of the mixer output.

*Case 1.*—If $h$ and $\Delta F$ are of such values that B lies in front of the first peak 3.05 of the Bessel function, the situation is as in Case 1. Here, the output, being proportional to $J_2(B)$, varies in amplitude at a 400-c.p.s. rate as B varies.

*Case 2.*—For appropriate values of $h$ and $\Delta F$, $B_0$ lies at the first peak of the Bessel function. Under this condition, the output amplitude variation contains no 400-c.p.s. component; only higher harmonics of 400 c.p.s. are present, which are unimportant here.

*Case 3.*—For other values of $h$ and $\Delta F$, $B_0$ lies beyond the first peak of the Bessel function. As in Case 1, the output amplitude varies at a 400-c.p.s. rate, but the phase is now opposite that in Case 1.

The 400-c.p.s. component thus provides a reversible-phase signal with a null at the peak, and yields required information on which the servo loop of the present system can operate to maintain $B_0$ at some fixed value, namely the value 3.05 corresponding to the first peak of the appropriate Bessel function, here selected to be $J_2(B)$.

This is accomplished by amplitude-detecting the selected spectral line of the output of the I.-F. amplifier to recover the 400 cycle modulation component. This is phase-detected, using the original 400-c.p.s. modulating signal as reference. The output of the phase detector is thus a direct voltage having opposite signs for $B_0$ above and below the first peak of the Bessel function, and going to zero as $B_0$ approaches the first peak of the Bessel function from either direction. This direct voltage is used as the error signal in a servo loop, which varies $\Delta F_0$ as function of $h$ to keep the product $\Delta M_0 h$ constant.

Experience has shown that for a general purpose altimeter, operating for example from touchdown to 3,000 feet over all types of terrain, the best spectral line to select for amplification and detection is either of those at $f_t - f_d \pm 2f_1$, that is, the second harmonic of the modulating frequency, corresponding to $J_2(B)$ discussed above. This mode of operation provides better rejection of short delay signals than does operation on the first harmonic of the modulating frequency and does not require a very large deviation at low altitudes as does operation at the third harmonic.

THE GENERAL SYSTEM

The general system as shown schematically in the block diagram of FIGURE 2 in which the lines connecting the blocks are generally illustrative of the functional flow of signals in the directions indicated by the arrowheads.

The A source 12 of control frequency frequency (which may be an oscillator or other power source) providing a constant low frequency output $f_2$, illustratively of the order of 400 cycles per second, is coupled to a deviation oscillator-modulator 13 whose output is of the deviation frequency $f_1$ (illustratively of the order of 25 kilocycles per second) amplitude-modulated at the control frequency $f_2$. The output of the deviation oscillator-modulator 13, after amplitude adjustment by a control 14, is supplied to an operational amplifier 16, which controls the amplitude of the $f_1$ signal in a manner to be described more in detail below. Amplifier 16 supplies a deviation signal by way of lead 17 to a transmitter-oscillator 18. Transmitter-oscillator 18 generates a carrier frequency $f_0$ and is frequency-modulated by the deviation signal of frequency $f_1$ amplitude-modulated at control frequency $f_2$. Illustratively, the transmitter-oscillator 18 may be a reflex klystron oscillator to whose repeller electrode the deviation signal is applied. The output of the transmitter-oscillator 18 is supplied through a coupler 19 to a transmitting antenna 21, such as a waveguide horn radiator. Coupler 19 transmits substantially all its input energy to antenna 21, but a small part is supplied to a translator 20. Also supplied to the translator 20 is the output of a translator oscillator 22 having a translation frequency $f_t$ which may be of the order of 210 kilocycles per second. The translator 20 is any suitable device which will translate the frequency of its input by a fixed amount. In one form it may be a magic Tee waveguide device to which the output of the transmitter-oscillator is supplied on an H plane arm. Two other H plane arms of the magic Tee have diodes across them, with one diode placed one-eighth wavelength more from the T junction than the other, the two diodes being fed with signals of the translator frequency $f_t$, in phase quadrature. The horn or radiator 21 is connected to the fourth E-plane arm of the Tee. This arrangement effectively alters the impedance at the ends of the two diode arms causing a reversal in reflection characteristic with each alteration of the translator frequency signal. The result is a shift in frequency of the signal supplied from the transmitter-oscillator 18, the frequency shift being equal to the translator frequency $f_t$. The translator-oscillator 22 may be any common form of radio-frequency oscillator suitable for generating the translator frequency $f_t$, and for splitting it into quadrature phases by any conventional bridge network or other means.

The output of the translator 20 is then a local signal which has the same frequency components as the transmitted signal, but frequency shifted by the translator frequency $f_t$.

The signal radiated from antenna 21 is therefore a carrier wave of frequency $f_0$, frequency-modulated at the frequency $f_1$, with the deviation being periodically varied at the control frequency $f_2$. This radiated signal is reflected from the terrain and is then received by a receiving radiator or horn 24 and supplied to a mixer 26 to which is also supplied the local signal from translator 20. The mixer 26 is preferably of the balanced type, such as a magic Tee mixer, and produces output components representing the differences between the spectral components of the return signal and of the local signal. As indicated above, the mixer output consists of spectral lines at $f_t - f_d \pm nf_1$, where $f_d$ is the doppler frequency shift caused by relative motion of the airborne equipment and the terrain. Each spectral line is varied in amplitude at $f_2$, and hence has sidebands spaced on either side of it at multiples of $f_2$. In the example given above, where $f_t$ is of the order of 210 kilocycles per second and $f_1$ is of the order of 25 kilocycles per second, the spectral lines will occur, for example, at or near 235 kilocycles per second for the first harmonic, 260 kilocycles per second for the second harmonic, and 285 kilocycles for the third harmonic.

The i–f preamplifier 27 coupled to the output of mixer 26 is tuned to have a narrow bandwidth at one of these frequencies, preferably the second harmonic frequency, adjacent 260 kilocycles per second in this example. The bandwidth of the preamplifier circuit 27 is made wide enough to pass the amplitude-modulation sidebands created by the control frequency $f_2$ as well as the doppler shift $f_d$ to be experienced, but excludes other spectral lines. The result is a signal whose time variation and amplitude depend upon the altitude $h$, the mean deviation $\Delta F_0$, and the percentage of amplitude modulation $m$ produced in the modulator 13. Recalling the expression for B in Equation 4.9, and that the amplitude of the spectral line is given by the second order Bessel function of the first kind, $J_2(B)$, the output of the I.-F. preamplifier 27 then has an amplitude represented by FIGURE 1 as described above.

The output of the preamplifier 27 is applied to the I.-F. amplifier-detector 28 which has automatic gain control circuits discussed below, and is coupled to a reliability circuit 31 to be described. The circuit 28 includes a conventional detector which detects the I.-F. signal (illustratively 260 kc.) and converts it to the $f_2$ signal-(illustratively 400 c.p.s.). The output of the circuit 28, of the frequency $f_2$, is supplied to a phase detector 32 to which is also supplied a reference signal from control frequency source 12. Detector 32 is a phase-sensitive detector of any suitable type, which produces a uni-directional reversible-polarity output corresponding in amplitude and polarity to the amplitude and phase-sense of its input.

The output of phase detector 32 is an altitude-error signal; that is, it is a signal which is proportional to the difference between the actual altitude $h$ above terrain and the indicated altitude $\bar{h}$ shown by the indicator expressed as a percentage of the altitude. The signal is in the form of a reversible-polarity direct-current signal which is zero when the indicated altitude equals the actual altitude, and has a polarity depending upon the sense of difference between these two altitudes. The D.-C. altitude-error signal is then supplied to an electronic integrator and sweep circuit 33. As described more in detail below, upon failure of a reliable signal, the integrator arrangement is automatically converted to a sweep circuit to provide a cycling signal which drives the system back and forth between its limits (such as three feet to 3,000 feet) until a reliable signal is received upon which the system can lock in.

The integrator circuit 33 serves to produce a direct-current output which is a time integral of the percent altitude error signal supplied to it. The integrator circuit 33 is preferably a direct-current amplifier with high negative capacitive feedback providing a low-impedance output.

As indicated above, the nulling action by which the system is locked to the peak of the $J_2(B)$ function is accomplished by adjusting the deviation of the klystron oscillator 18 in correspondence with the altitude signal. The altitude-error signal is utilized to change the average deviation so as to reduce the error signal to zero. The average deviation is, of course, determined by the average amplitude of the deviation signal of frequency $f_1$ (ignoring for the moment its amplitude modulation at the control frequency $f_2$). For this purpose the altitude-error signal derived from the integrator and sweep circuit 33 is supplied to a computer system formed by a diode attenuator circuit 34, an operational amplifier 16, a feedback amplifier 37 and an altitude amplifier 42. In a manner described below, the deviation signal derived from amplifier 16 is adjusted until the altitude error is zero. This can occur only when $B_0 = 3.05$, which is the peak of the Bessel function. As seen from Eq. 4.10, when $B_0$ is constant, so is the product of $\Delta F_0$ and $h$. Hence the circuit keeps $h$ times $\Delta F_0$ constant, by varying $\Delta F_0$ by the proper amount in response to the altitude-error signal. It does this by changing the gain of operational amplifier 16 (by control of the amount of feedback through diode attenuator circuit 34 and feedback amplifier 37) to thereby adjust the deviation signal on lead 17 to the proper value to null the altitude-error signal.

At the same time, for purposes of controlling auto pilots, indicators, and the like, it is desirable to have an altitude signal, that is, a signal whose amplitude is linearly proportional to altitude and with a dynamic response which is substantially independent of altitude. According to an important feature of the present invention, this altitude signal is derived from the same computer circuit (formed by amplifiers 16 and 37, and attenuator circuit 34) which maintains the nulling. In this way any change in diode characteristics, with aging or the like, does not affect the altitude signal; so long as the system is properly nulled, the proper altitude signal is derived.

The function of the computer circuit is to derive from the altitude-error signal, representing the percentage difference between the indicated and actual altitudes, a signal linearly proportioned to actual altitude, which can be used in controlling the indicator to read the actual altitude and also to actuate any other system in the craft desiring such a signal, such as an automatic pilot or other navigational computers. In this computation, advantage is taken of the fact, illustrated by the foregoing discussion, that, when the error signal is zero, the deviation signal which determines the deviation of the transmitted frequency-modulated wave, is in inverse proportion to the altitude. This follows in the present system from the fact that the average value $B_0$ of the modulation index B is maintained constant at the peak of the second order Bessel function $J_2(B)$. Since, as shown by Equation 4.9, $B_0$ is proportional to the product of the frequency deviation $\Delta F_0$ and the altitude $h$, it follows that for a constant value of $B_0$, $h$ is inversely proportional to $\Delta F_0$. The computer system adjusts $\Delta F_0$ to the proper value for $B_0$ to be constant, and at the same time solves the equation to provide a signal proportional to $h$.

For this purpose the deviation signal output of deviation oscillator 13 (having frequency $f_1$ amplitude modulated at the control frequency $f_a$) of uniform and regulated amplitude $E_k$ is supplied to the input of operational amplifier 16 whose gain and hence output is determined by the amount of its feedback. Amplifier 16 is a high gain amplifier, having a gain of 1000 or more, corresponding to the range of altitudes to be indicated (3 feet to 3000 feet). The feedback path for operational amplifier, 16 is provided by lead 36 into diode attenuator circuit 34 and then by lead 39 to feedback amplifier 37 whose output is supplied by lead 38 to the input of operational amplifier 16. The diode attenuator circuit 34 is described more in detail below; briefly, its function is to control the amount of the deviation oscillator output signal $f_1$ which is passed by the feedback amplifier 37, in response to the input altitude-error signal. In this way the $f_1$ output of the operational amplifier 16 is given the proper magnitude to drive the transmitter-oscillator 18 by way of lead 17 to produce the required deviation for the transmitted wave to reduce the altitude-error signal to zero where the system has a stable reading. The gain of the operational amplifier 16 is the ratio of its input voltage $e_0$ to its output voltage $e_1$ and is given by the following expression $$\frac{e_0}{e_1} = \frac{\mu}{1-\mu b} \quad (11)$$

where $\mu$ is the gain of the amplifier without feedback and $b$ is the feedback ratio of the amplifier 16 (i.e., the portion of its output fed back to the input). In the present case, $b$ is determined by the fixed gain of feedback amplifier 37 and the attenuation offered by diode attenuator circuit 34, which is in turn determined by the altitude-error signal from integrator 33. Here $b$ is controlled by the system at the value required to null the altitude-error signal.

Since the value of $\mu$ is high, of the order of 1,000, the ratio of input of amplifier 16 to its output approximate $1/b$ with sufficient closeness. Since the input to operational amplifier 16 is held constant, because the output of deviation oscillator 13 is constant, and the output is the deviation signal, proportional to $\Delta F$, $b$ is controlled to be proportional to the reciprocal of the desired deviation signal and to the reciprocal of the desired $\Delta F_0$. This shows that $b$ is directly and linearly proportional to altitude $h$. Advantage is taken of this relationship to derive the altitude signal.

The feedback ratio $b$ is the proportion of the output signal of operational amplifier 16 which is fed back to its input on lead 38. It is essentially the ratio of the signal on lead 36 to the signal on lead 38, and is determined both by the diode attenuator circuit 34 and the feedback amplifier 37.

According to an important aspect of the present invention, a second signal is injected into the circuit comprising the diode attenuator 34 and feedback amplifier 37, so as to be subjected to exactly the same amplitude change as the signal on lead 36 is subjected to by attenuator 34 and amplifier 37. By making this new input signal of constant value, the output of feedback amplifier 37 will be $b$ times this fixed value input $E_a$ and will thus be proportional to the altitude $h$.

For this purpose a signal of frequency $f_a$ (which may be the same as $f_2$ if desired) supplied to the diode attenuator circuit 34 by lead 41 in a manner described below with respect to the reliability circuit. Hence, the diode attenuator circuit 34 has an input of frequency $f_a$ as well as an input of frequency $f_1$ and attenuates both of these signals simultaneously and equally. Both of these signals are supplied to the feedback amplifier 37 where they are amplified equally. The output of feedback amplifier 37 is supplied not only to the operational amplifier 16 by way of lead 38 but also to the altitude amplifier 42 by way of lead 43. Operational amplifier 16 is supplied with suitable circuits such as high pass filter circuits and wave traps to eliminate the signals of frequency $f_a$. Similarly the altitude amplifier 42 has suitable circuits such as low pass filters and wave traps to eliminate frequencies of the order of $f_1$. The output of the altitude amplifier 42 is then supplied by way of lead 49 to a suitable altitude indicator or other circuit such as an autopilot or navigational computer or the like, utilizing an altitude proportional signal.

The circuit of the diode attenuator arrangement is shown more in detail in FIGURE 3 and consists primarily of a pair of diodes CR1 and CR2 coupled in series with a capacitor C5 between lead 35 from the output of integrator 33 and ground. D.C. return is provided via lead 44 to ground as shown in the I.F. circuit of FIG. 4. A pair of series-connected capacitors C4 and C23 is also connected between lead 35 and ground. Lead 41 coming from the source of frequency $f_a$ of constant amplitude is connected to the junction 61 of diodes CR1 and CR2 through a coupling circuit formed by capacitor C1 and resistor R1. Lead 36 supplying signal of frequency $f_1$ from the output of operational amplifier 16 is also supplied to the junction 61 by way of a coupling capacitor C2 and a parallel coupling network C3 and R2. The diode junction 61 is also coupled to lead 39 by a coupling network C6 and R3, and lead 39 is then connected to the input of the feedback amplifier 37, preferably of the transistor type.

The D.-C. integrated altitude-error signal appearing on lead 35 determines the impedances of the diodes CR1 and CR2 and controls the amount of signal of frequencies $f_1$ and $f_a$ which is supplied by way of these diodes CR1 and CR2 to input of the feedback amplifier 37. In this way the output of the feedback amplifier 37 has a magnitude which is determined by the integrated altitude-error signal, and has two components, respectively, of frequency $f_a$ and of the deviation frequency $f_1$. As indicated above, this arrangement controls the amount of feedback for the operational amplifier 16 and simultaneously determines the magnitude of the altitude signal $f_a$ appearing at the output of feedback amplifier 37, so as to make it linearly proportional to the altitude itself.

Figure 5:
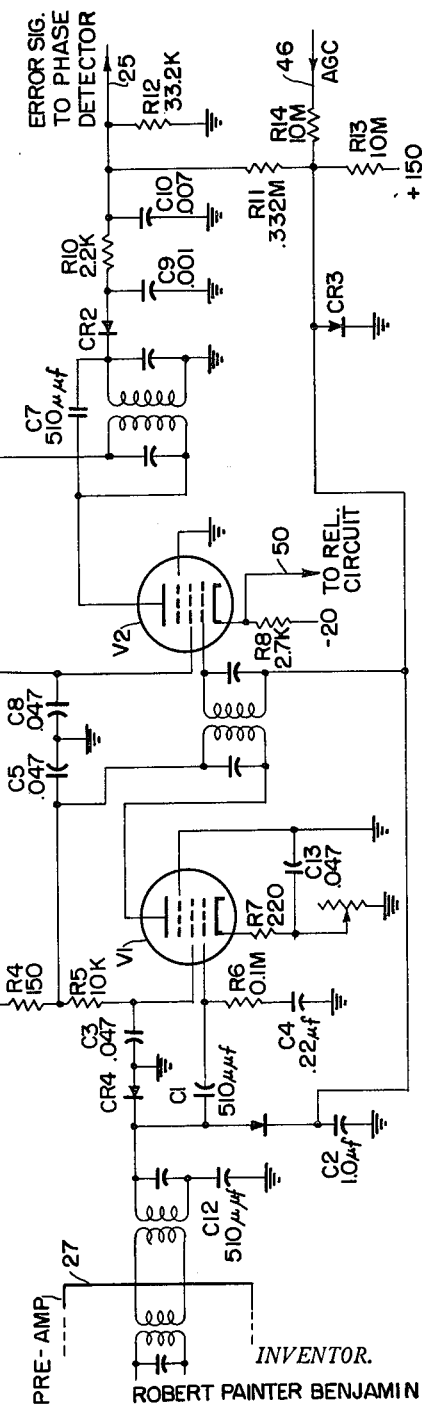
FIGURE 5 is a schematic diagram of the intermediate frequency amplifier of the system of the present invention.

As another aspect of the present invention, an automatic gain control is derived from the diode attenuator circuit of FIGURE 3, from the junction of diode CR2 and capacitor C5 and is supplied to the I.-F. amplifier 28 by lead 44. This signal adjusts the gain of the I.-F. amplifier 28 so that for high altitudes the I.-F. amplifier gain is high and vice versa. The circuit of the I.-F. amplifier 28 may be as shown in FIG. 5.

This arrangement, by which both the altitude signal and the deviation signal are derived from the same diode attenuator circuit, has the advantage that any drift or aging in the characteristics of the diodes CR1 and CR2 will simultaneously and equally affect both the deviation signal and the altitude signal. Since the deviation signal merely drives the system to a null altitude-error signal, the specific quantitative characteristics of CR1 and CR2 are not important for this operation for steady state operation. However, it is important in the computation of the altitude signal from the deviation signal that the altitude signal computation be subject to identically the same perturbations as the deviation signal.

This is assured by the present arrangement in having the altitude signal pass through the same diode attenuator circuit and feedback amplifier as does the deviation signal.

It is desirable that the signal level in the diodes CR1 and CR2 be kept small so as to avoid intermodulation between the $f_1$ deviation signal and the $f_a$ altitude signal.

Since these signals have different frequencies, being illustratively 400 cycles for $f_a$ and 25 kc.±400 cycles for $f_1$, these signals can be readily separated at the output of the feedback amplifier 37 and interaction can be minimized.

While as indicated above the specific characteristics of the diodes CR1 and CR2 are not important for steady state operation, for attaining the advantage of constant dynamic response, diodes CR1 and CR2 should desirably be exponential in their characteristics, which, in combination with the integration performed in circuit 33 realizes the simple first order relation having constant time-constant response and hence constant dynamic response. However, since this exponential reaction is not readily attainable with diodes over their entire range, for low altitudes, such as under 100 feet, it is desirable that the altitude-error signal be further increased. This is accomplished in the present invention, as shown in FIGURE 2, by rectifying the deviation signal appearing on lead 17 and supplying this rectified deviation signal by way of lead 46 to the I.-F. amplifier to increase its gain in proportion to the deviation signal.

The present system has thus combined a number of non-linear elements in a closed-loop system to obtain the dynamic characteristics of a linear system. It can be shown that the selected spectral component of the mixer output is substantially proportional to the percentage altitude error $h-\bar{h}/\bar{h}$, which is a non-linear function of the indicated altitude $h$. By the use of the integrator 33 and exponential characteristic for attenuator circuit 34, the undesired non-linear term $\bar{h}$ can be eliminated and the desirable dynamic response characteristic of a simple linear system with constant coefficients is attained.

RELIABILITY CIRCUIT

As indicated above, the present system responds to a selected spectral component of the output of the mixer and keeps the amplitude of this component at a fixed value corresponding in the present instance to the first peak 3.05 of $J_2(B)$. If the output of the mixer or the signal in the I.-F. amplifier should drop to a low value, as may be the case upon excessive banking or rolling of the aircraft or due to malfunction of the equipment or for other reasons, the signal which gives the altitude indication or control will be unreliable. Under these circumstances for safety it is desirable that a specific indication be given of this unreliability and in addition other action should be taken.

If the circuit became unreliable for loss of signal it might be dangerous to stop the system in the condition that existed when it last received a reliable signal, since then the altitude indication would be a false one. According to the present invention, means are provided for replacing the unreliable altitude signal with a value of signal which drives the altitude indicator off scale. At the same time a "fail" indication is given, as by a meter flag. Simultaneously the integrator circuit 33 is converted from its integrating function to a sweep function. In place of merely integrating the input altitude-error signal, which is now unreliable, the circuit is converted into a phantastron relaxation oscillator, which produces a very slow saw-tooth output which may illustratively go thorugh its cycle every 10 seconds. This output passes through the diode attenuator circuit and controls the output of the operational amplifier so as to sweep the deviation signal, which will scan the system periodically between a minimum and maximum altitude at the frequency of this saw-tooth. This sweep operation continues until a reliable signal is received once more, in which case the system automatically converts back to its normal operating mode.

This reliability operation is performed by a reliable circuit 31 shown in FIG. 2, which is supplied with a signal from the I.-F. amplifier 28. The reliable circuit is essentially an amplifier in whose output is a relay K1 which remains energized so long as the level of the signal in the I.-F. amplifier remains at a reliable value. Should the signal in the I.-F. amplifier diminish below this reliable level, then relay K1 becomes deenergized. Relay K1 has a pair of contacts K1–A and K1–B which are respectively connected to the source 12 of control frequency $f_2$ (or $f_a$) when the system is in its reliable or unreliable condition. In normal reliable operation, source 12 is connected through contact K1–A to the input 41 of the diode attenuator circuit already described. When the system becomes unreliable, relay K1 is de-energized and source 12 is connected to lead 46 and thereby through lead 47 to altitude smplifier 42, and through lead 48 to the integrator and sweep circuit 33. At the same time the input 41 to diode circuit 34 is cut off, thereby interrupting the supply of altitude signal to feedback amplifier 37 and altitude amplifier 42. In place of this, amplitude amplifier 42 is supplied with a fixed value of signal of frequency $f_2$ (or $f_a$) over lead 47 and this fixed signal causes the altimeter and altitude signal to proceed to an off scale, and to excite a suitable flag warning indicator.

The signal supplied to integrator 33 by way of lead 48 is rectified and thereby changes the bias level for integrator 33 to convert it into the slow sweep phantastron circuit already indicated.

The circuit of this arrangement is illustrated in FIG. 4. This circuit comprises a three-stage amplifier provided by tube V1 and transistors Q2 and Q3, with a feedback path 51 to provide a unity-gain amplifier serving as an integrator with respect to signals supplied to input lead 30. Upon occurrence of an unreliability situation, $f_2$ input is supplied to lead 48 and is rectified by diode CR4 to provide a bias on the grid of tube V1 which converts the system to a phantastron oscillator arrangement. This overrides any signal coming in on lead 30 which, in general, will be of small value anyway.

When a reliable I.-F. signal is received, relay K1 again becomes energized and removes the unreliability signals from the integrator 33 and altitude amplifier 42 to restore these two circuits to their customary operation. At the same time, the altitude signal $f_a$ is supplied to the diode circuit 34 so as to create once more the altitude signal on lead 49.

It will be obvious that many portions of the present system may use a wide variety of circuits. In particular those illustrated herein in block form may be of any conventional or suitable type adapted to perform the functions ascribed to them.

It will also be understood that the output of the altitude amplifier 42 may be used to actuate any desired kind of indicator or control circuit. By way of example, an alternating or direct-current altitude signal may be used to drive a pointer motor by any suitable type of servomechanism adapted to position a mechanical member in one-to-one correspondence with the amplitude of signal. A conventional rate generator may be coupled to the motor to derive signals corresponding to altitude rate, which may be indicated in any desired manner.

While the foregoing description has illustratively described a radio altimeter system, it will be readily apparent that it is equally adapted to indicate distance to any reflecting object. Also, the computing system is adapted for use wherever two separate signals are to be derived, the product of whose amplitudes is a constant.

In addition, the techniques illustrated here of combining non-linear elements to realize a constant time-constant response characteristic of a linear system may be employed in many other closed-loop systems, such as automatic gain control systems, where such response is desired.

While the foregoing system has been described in terms of maintaining B at the value producing the first maximum of the Bessel function $J_2(B)$, it will be understood that B may be maintained at other fixed values, such as the maxima or zeroes of other Bessel funtcions. In each instance, the amplitude of the selected spectral component of the mixer output is maintained at a fixed condition, i.e., at a maximum or zero corresponding to the fixed value of B. For example, a zero of $J_0(B)$ or higher order Bessel function or the first or higher maxima of $J_1(B)$, or of higher order functions may be used, although it is believed that these alternatives may offer less advantage than the system specifically described above.

Since many apparently widely varying types of structure may be utilized in the present invention it is to be understood that the embodiment described above is to be considered illustrative only, and is not to be taken in a limited sense, the invention itself being defined solely by the appended claims.

What is claimed as the invention is:

1. A continuous-wave frequency-modulation radio distance-measuring system comprising means for radiating a frequency-modulated carrier wave, means for receiving said frequency-modulated carrier wave after reflection from a remote point, means for producing from said received wave a control signal whose magnitude varies as a Bessel function of the product of distance to said point by the frequency deviation of said radiated wave, means for varying said frequency deviation under the control of said signal to maintain said control signal at a peak of said Bessel function, said means comprising a source of modulating signal of fixed amplitude, an operational amplifier supplied by said source, a feedback circuit for said operational amplifier, means for controlling the amount of feedback in said path in response to said control signal, means for controlling the frequency deviation of said radiating means in response to the output of said operational amplifier, and means responsive to the control signal for obtaining from said feedback circuit a signal that is linearly proportional to distance.

2. A continuous-wave frequency-modulation radio distance-measuring system comprising means for radiating a frequency-modulated carrier wave, means for receiving said frequency-modulated carrier wave after reflection from a remote point, means for producing from said received wave a control signal whose magnitude varies as a Bessel function of the product of distance to said point by the frequency deviation of said radiated wave, means for varying said frequency deviation under the control of said signal to maintain said control signal at a peak of said Bessel function, said means comprising a source of modulating signal of fixed amplitude, an operational amplifier supplied by said source, a feedback circuit for said operational amplifier comprising an attenuating circuit in sequence with a feedback amplifier, means controlling the attenuation of said attenuating circuit in response to said control signal, means for controlling the frequency deviation of said radiating means in response to the output of said operational amplifier, and means responsive to the control signal for obtaining from said attenuating circuit and said feedback amplifier a signal linearly proportional to distance.

3. A continuous-wave frequency-modulation radio altimeter system comprising means for radiating a frequency-modulated carrier wave, means for receiving said frequency-modulated carrier wave after reflection from terrain, means for producing from said received wave a control signal whose magnitude varies as a Bessel function of the product of altitude by the frequency deviation of said radiated wave, means for varying said frequency deviation under the control of said signal to maintain said control signal at a peak of said Bessel function characteristic, said means comprising a source of modulating signal of fixed amplitude, an operational amplifier supplied by said source, a feedback circuit for said operational amplifier comprising an attenuating circuit in sequence with a feedback amplifier, means controlling the attenuation of said attenuating circuit in response to said control signal, means for controlling the frequency deviation of said radiating means in response to the output of said operational amplifier, and means for deriving from said attenuating circuit and said feedback amplifier a signal linearly proportional to altitude, said last means comprising a second source of fixed signal, means supplying said second signal to the input of said attenuating circuit, and means obtaining said altitude signal from the output of said feedback amplifier.

4. In a radio distance-measuring system in which a carrier wave frequency-modulated at a modulating frequency is radiated to and received by reflection from a distant point, and in which the reflected wave is mixed with a frequency-shifted portion of said carrier wave to form a difference-frequency signal, and in which a spectral component of said difference-frequency signal has an amplitude which is maintained substantially in a fixed condition by adjustment of the frequency deviation of said frequency-modulated carrier wave; the improvement comprising a source of modulating-frequency signal of fixed amplitude; means for varying the amplitude of said modulating-frequency signal in correspondence with departure of said spectral component amplitude from said fixed condition, said last means comprising an operational amplifier, a feedback circuit for said amplifier comprising an attenuating circuit and a feedback amplifier, and means for controlling said attenuating circuit by said spectral component departure; means for controlling the frequency deviation of said radiated frequency-modulated carrier wave by the output of said operational amplifier; and means responsive to said spectral component departure and including said feedback circuit for obtaining a signal substantially linearly proportional to the distance to said remote point.

5. In a radio distance-measuring system in which a carrier wave frequency-modulated at a modulating frequency is radiated to and received by reflection from a distant point, and in which the reflected wave is mixed with a frequency-shifted portion of said carrier wave to form a difference-frequency signal, and in which a spectral component of said difference-frequency signal has an amplitude which is maintained substantially in a fixed condition by adjustment of the frequency deviation of said frequency-modulated carrier wave; the improvement comprising a source of fixed-amplitude signal of said modulating frequency; means for varying the amplitude of said modulating-frequency signal in correspondence with departure of said spectral component amplitude from said fixed condition, said last means comprising an operational amplifier, a feedback circuit for said amplifier comprising an attenuating circuit and a feedback amplifier; and means for controlling said attenuating circuit by said spectral component departure; means for controlling the frequency deviation of said radiated frequency-modulated carrier wave by the output of said operational amplifier; a second source of fixed-amplitude signal; means supplying said second fixed-amplitude signal to the input of said feedback circuit; and means obtaining an altitude-representative signal from the output of said feedback circuit.

6. In a radio distance-measuring system in which a carrier wave frequency-modulated at a modulating frequency is radiated to and received by reflection from a distant point, and in which the reflected wave is mixed with a frequency-shifted portion of said carrier wave to form a difference-frequency signal, and in which a spectral component of said difference-frequency signal has an amplitude which is maintained substantially in a fixed condition by adjustment of the frequency deviation of said frequency-modulated carrier wave; the improvement comprising a source of fixed-amplitude signal of said modulating frequency, means for varying the amplitude of said modulating-frequency signal in corresponpondance with departure of said spectral component amplitude from said fixed condition, said last means comprising an operational amplifier, a feedback circuit for said amplifier comprising an adjustable attenuating circuit and a feedback amplifier in sequence with said circuit, and means for adjusting said attenuating circuit by said spectral component departure; means for controlling said frequency deviation of said radiated frequency-modulated carrier wave by the output of said operational amplifier; a second source of fixed-amplitude control signal of a frequency different from said modulating frequency, means passing said control signal through said attenuating circuit and said feedback amplifier; and distance-indicating means responsive to said control signal at the output of said feedback amplifier, whereby said control signal is directly proportional to the distance to said remote point.

7. A radio altimeter system comprising means for radiating a carrier wave frequency-modulated by a frequency-modulating signal, means for receiving said frequency-modulated wave after reflection from terrain, means for deriving a local wave by frequency-translating said carrier wave by a fixed frequency shift, means for mixing said local wave with said received wave to produce a difference-frequency signal, means for separating from said signal a spectral component of a frequency substantially equal to said frequency shift increased by twice said modulating frequency, whereby the amplitude of said spectral component varies with altitude above said terrain and, the frequency deviation of said radiated wave in accordance with the expression $J_2(B)$, where $J_2(B)$ is the Bessel function of first kind and second order and B is proportional to the product of said frequency deviation and said altitude, and means for controlling said frequency deviation to maintain said function $J_2(B)$ at its first maximum value for which $B=3.05$; said last means comprising: a fixed amplitude source of said frequency-modulating signal, an operational amplifier connected to the fixed amplitude output of said source, a feedback circuit for said operational amplifier comprising an adjustable attenuator and a feedback amplifier coupled in sequence to the output of said attenuator, means for adjusting the attenuation of said attenuator in correspondence with departure of said spectral component amplitude from the valve producing said Bessel function maximum value, means for controlling said frequency deviation by the output of said operational amplifier and means responsive to the departure of said spectral component amplitude from said maximum value for obtaining from said feedback circuit a signal substantially linearly proportional to the distance to said remote point.

8. A radio altimeter system comprising means for radiating a carrier wave frequency-modulated by a frequency-modulating signal, means for receiving said frequency-modulated wave after reflection from terrain, means for deriving a local wave by frequency-translating said carrier wave by a fixed frequency shift, means for mixing said local wave with said received wave to produce a difference-frequency signal, means for separating from said signal a spectral component of a frequency substantially equal to said frequency shift increased by a twice said modulating frequency, whereby the amplitude of said spectral component varies with altitude above said terrain and the frequency deviation of said radiated wave in accordance with the expression $J_2(B)$, where $J_2(B)$ is the Bessel function of first kind and second order and B is proportional to the product of said frequency deviation and said altitude, and means for controlling said frequency deviation to maintain said function $J_2(B)$ at its first maximum value for which $B=3.05$; said last means comprising: a fixed-amplitude source of said frequency-modulating signal, an operational amplifier connected to the fixed-amplitude output of said source, a feedback circuit for said operational amplifier comprising an adjustable attenuator and a feedback amplifier coupled in sequence to the output of said attenuator, means for adjusting the attenuation of said attenuator in correspondence with departure of said spectral component amplitude from the value producing said Bessel function maximum value, and means for controlling said frequency deviation by the output of said operational amplifier; a second fixed-amplitude source of a control signal, means connecting said second source to the input to said attenuator, whereby the output of said feedback amplifier is an altitude signal directly proportional to said altitude, and means utilizing said altitude signal.

9. A continuous-wave frequency-modulation radio distance-measuring system comprising means for radiating a frequency-modulated carrier wave, means for receiving said frequency-modulated carrier wave after reflection from a remote point, means for producing from said received wave a control signal whose magnitude varies as a Bessel function of the product of distance to said point by the frequency deviation of said radiated wave, means for varying said frequency deviation under the control of said signal to maintain said control signal at a peak of said Bessel function, means responsive to occurrence of unreliability in said control signal for disabling said frequency-deviation-varying means, means for thereupon generating a sawtooth signal, and means for controlling said frequency-deviation-varying means by said sawtooth signal.

10. A continuous-wave frequency-modulation radio distance-measuring system comprising means for radiating a frequency-modulated carrier wave, means for receiving said frequency-modulated carrier wave after reflection from a remote point, means for producing from said received wave a control signal whose magnitude varies as a Bessel function of the product of distance to said point by the frequency deviation of said radiated wave, means for varying said frequency deviation under the control of said signal to maintain said control signal at a peak of said Bessel function, means responsive to occurrence of unreliability in said control signal for disabling said control signal from controlling said frequency-deviation-varying means, means for thereupon generating a sawtooth signal, and means for controlling said frequency-deviation-varying means by said sawtooth signal, and means responsive to the occurrence of unreliability in said control signal for simultaneously indicating an extreme value of distance.

11. A continuous-wave frequency-modulation radio distance-measuring system comprising means for radiating a frequency-modulated carrier wave, means for receiving said frequency-modulated carrier wave after reflection from a remote point, means for producing from said received wave a control signal whose magnitude varies as a Bessel function of the product of distance to said point by the frequency deviation of said radiated wave, means for varying said frequency deviation under the control of said signal to maintain said control signal at a peak of said Bessel function, said means comprising a source of modulating signal of fixed amplitude, an operational amplifier supplied by said source, a feedback path for said operational amplifier, means for controlling the amount of feedback in said path in response to said control signal, means for controlling the frequency deviation of said radiating means in response to the output of said operational amplifier, means responsive to occurrence of unreliability in said control signal for substituting a sawtooth signal for said control signal, and means responsive to the occurrence of unreliability in said control signal for simultaneously indicating an extreme value of distance.

12. A radio altimeter system comprising means for radiating a carrier wave frequency-modulated by a frequency-modulating signal, means for receiving said frequency-modulated wave after reflection from terrain, means for deriving a local wave by frequency-translating said carrier wave by a fixed frequency shift, means for mixing said local wave with said received wave to produce a difference-frequency signal, means for separating from said difference frequency signal a spectral component of a frequency substantially equal to said frequency shift increased by twice said modulating frequency, whereby the amplitude of said spectral component varies with altitude above said terrain and with the frequency deviation of said radiated wave in accordance with the expression $J_2(B)$, where $J_2(B)$ is the Bessel function of first kind and second order and B is proportional to the product of said frequency deviation and said altitude, means responsive to said component for normally controlling said frequency deviation to maintain said function $J_2(B)$ at its first maximum value for which $B=3.05$, and means responsive to the occurrence of unreliability in said spectral component for generating a sawtooth wave, and means for controlling said frequency deviation only by said sawtooth wave so long as said unreliability condition continues.

13. A radio altimeter system comprising means for radiating a carrier wave frequency-modulated by a frequency-modulating signal, means for receiving said frequency-modulated wave after reflection from terrain, means for deriving a local wave by frequency-translating said carrier wave by a fixed frequency shift, means for mixing said local wave with said received wave to produce a difference-frequency signal means for separating from said difference frequency signal a spectral component of a frequency substantially equal to said frequency shift increased by twice said modulating frequency, whereby the amplitude of said spectral component varies with altitude above said terrain and with the frequency deviation of said radiated wave in accordance with the expression $J_2(B)$, where $J_2(B)$ is the Bessel function of first kind and second order and B is proportional to the product of said frequency deviation and said altitude, means responsive to said component for normally controlling said frequency deviation to maintain said function $J_2(B)$ at its first maximum value for which $B=3.05$, and means responsive to the occurrence of unreliability in said spectral component for generating a sawtooth wave, and means for controlling said frequency deviation only by said sawtooth wave so long as said unreliability condition continues, and means responsive to the occurrence of unreliability in said spectral component for simultaneously producing a fixed extreme-amplitude altitude signal to indicate said unreliability.

14. In a radio distance-measuring system in which a carrier wave frequency-modulated at a modulating frequency is radiated to and received by reflection from a distant point, and in which the reflected wave is mixed with a frequency-shifted portion of said carrier wave to form a difference-frequency signal, and in which a spectral component of said difference-frequency signal has an amplitude which is maintained substantially in a fixed condition by adjustment of the frequency deviation of said frequency-modulated carrier wave; the improvement comprising means for maintaining the dynamic response characteristics of said system substantially independent of distance to said point, said means comprising means for amplitude-detecting said spectral component to derive a percentage error signal, means for integrating said error signal, an operational amplifier, an adjustable feedback path for said amplifier including an attenuator having an exponential characteristic, means controlling said attenuator by said integrated error signal, a source of modulating-frequency signal coupled to the input of said amplifier, and means controlling said carrier wave by the output of said operational amplifier.

15. In a radio distance-measuring system in which a carrier wave frequency-modulated at a modulating frequency is radiated to and received by reflection from a distant point, and in which the reflected wave is mixed with a frequency-shifted portion of said carrier wave to form a difference-frequency signal, and in which a spectral component of said difference-frequency signal has an amplitude which is maintained substantially in a fixed condition by adjustment of the frequency deviation of said frequency-modulated carrier wave; the improvement comprising means for maintaining the dynamic response characteristics of said system substantially independent of distance to said point, said means comprising means for producing an error signal from said spectral component, means for integrating said error signal, and means comprising an exponential attenuator controlled by said integrated error signal for adjusting said frequency deviation.

16. In a radio distance-measuring system in which a carrier wave frequency-modulated at a modulating frequency is radiated to and received by reflection from a distant point, and in which the reflected wave is mixed with a frequency-shifted portion of said carrier wave to form a difference-frequency signal, and in which a spectral component of said difference-frequency signal has an amplitude which is maintained substantially in a fixed condition by adjustment of the frequency deviation of said frequency-modulated carrier wave; the improvement comprising means for maintaining the dynamic response characteristics of said system substantially independent of distance to said point, said means comprising an integrator controlled by said spectral component and an exponential attenuator controlled by said integrator.

References Cited by the Examiner
UNITED STATES PATENTS

| | | | |
|---|---|---|---|
| 3,054,104 | 9/1962 | Wright et al. | 343—14 |
| 3,112,481 | 9/1962 | Goldberg | 343—14 |

CHESTER L. JUSTUS, *Primary Examiner.*

KATHLEEN CLAFFY, *Examiner.*

D. MEXIC, R. E. KLEIN, *Assistant Examiners.*